United States Patent
Friesen et al.

(10) Patent No.: US 12,204,680 B2
(45) Date of Patent: *Jan. 21, 2025

(54) METHOD FOR ANONYMIZING MOVEMENT DATA

(71) Applicant: MERCEDES-BENZ GROUP AG, Stuttgart (DE)

(72) Inventors: Viktor Friesen, Karlsruhe (DE); Micha Koller, Pliezhausen (DE); Benjamin Nepp, Böblingen (DE); Hubert Rehborn, Sindelfingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,411

(22) Filed: Aug. 18, 2023

(65) Prior Publication Data

US 2023/0394177 A1 Dec. 7, 2023

Related U.S. Application Data

(63) Continuation of application No. 18/020,512, filed as application No. PCT/EP2022/053292 on Feb. 10, 2022.

(30) Foreign Application Priority Data

Mar. 16, 2021 (DE) .................... 10 2021 001 378.6

(51) Int. Cl.
*G06F 21/62* (2013.01)
*H04W 12/02* (2009.01)
*H04W 12/069* (2021.01)

(52) U.S. Cl.
CPC ........ *G06F 21/6254* (2013.01); *H04W 12/02* (2013.01); *H04W 12/069* (2021.01)

(58) Field of Classification Search
None
See application file for complete search history.

(56) References Cited

U.S. PATENT DOCUMENTS

| 10,380,885 B2 | 8/2019 | Biehle et al. |
| 10,424,128 B2 | 9/2019 | Oberschachtsiek et al. |

(Continued)

FOREIGN PATENT DOCUMENTS

| CA | 3072401 A1 | 2/2019 |
| DE | 102015217793 A1 | 3/2017 |

(Continued)

OTHER PUBLICATIONS

International Search Report and Written Opinion mailed Jun. 10, 2022 in related/corresponding International Application No. PCT/EP2022/053292.

(Continued)

*Primary Examiner* — Fatoumata Traore
(74) *Attorney, Agent, or Firm* — PATENT PORTFOLIO BUILDERS PLLC

(57) ABSTRACT

A method for anonymizing movement data of road users equipped with a position detection device involves collecting movement data in the form of individual time- and position-related data records and transmitting the collected movement data to a backend server. At least some data records are transmitted indirectly via at least one other vehicle, or the position or time reference in at least some data records is made noisy prior to the transmission.

7 Claims, 1 Drawing Sheet

(56) References Cited

U.S. PATENT DOCUMENTS

| | | | |
|---|---|---|---|
| 2012/0322458 A1 | 12/2012 | Shklarski et al. | |
| 2015/0160023 A1 | 6/2015 | Goel et al. | |
| 2017/0186314 A1* | 6/2017 | Bernhardt | H04L 67/12 |
| 2020/0387632 A1 | 12/2020 | McErlean | |
| 2021/0158693 A1* | 5/2021 | Sze | G08G 1/22 |
| 2021/0258776 A1* | 8/2021 | Stinner | G08G 1/096758 |
| 2022/0022032 A1* | 1/2022 | Ernst | H04W 4/48 |
| 2022/0120585 A1 | 4/2022 | Max et al. | |
| 2022/0268591 A1* | 8/2022 | Max | G07C 5/008 |
| 2022/0358247 A1* | 11/2022 | Max | H04W 4/46 |

FOREIGN PATENT DOCUMENTS

| | | |
|---|---|---|
| DE | 102019201530 | 7/2020 |
| DE | 102019205033 A1 | 10/2020 |

OTHER PUBLICATIONS

Office Action created May 6, 2022 in related/corresponding DE Application No. 10 2021 006 525.5.
Office Action created May 6, 2022 in related/corresponding DE Application No. 10 2021 006 526.3.
Office Action created Nov. 16, 2021 in related/corresponding DE Application No. 10 2021 001 378.6.
Office Action dated Mar. 12, 2024 in related/corresponding U.S. Appl. No. 18/235,413.

* cited by examiner

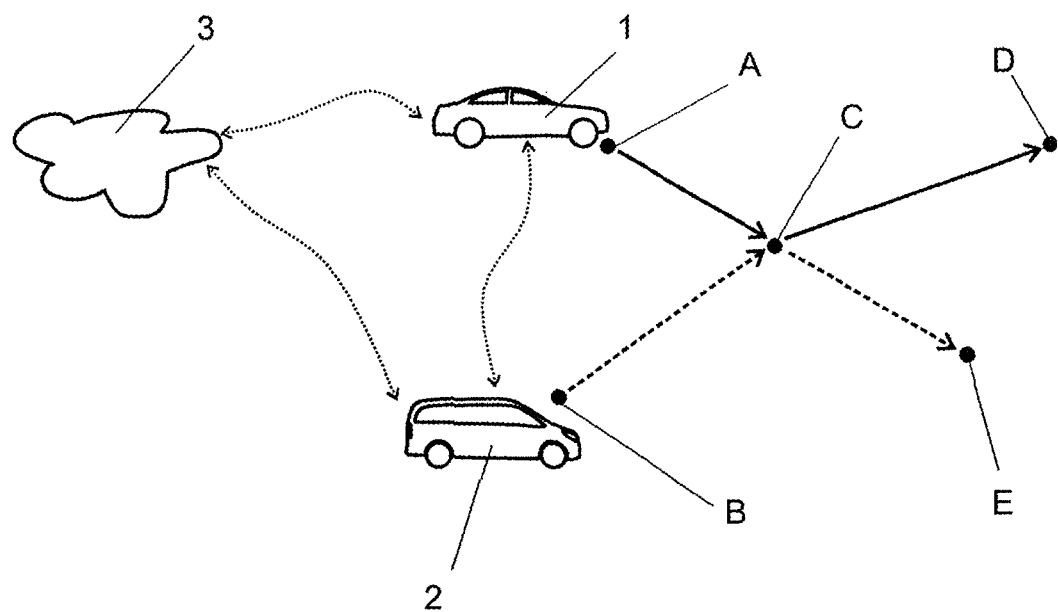

METHOD FOR ANONYMIZING MOVEMENT DATA

BACKGROUND AND SUMMARY OF THE INVENTION

Exemplary embodiments of the invention relate to a method for anonymizing movement data of road users equipped with a position detection device.

Laid-open application (Offenlegungsschrift) DE 10 2015 217 793 A1 describes an apparatus, a method, and a computer program for providing congestion information via a vehicle-to-vehicle interface. In that case, a vehicle detects congestion indicators, which comprise at least the speed of the vehicle and/or congestion warnings transmitted by vehicles in the vicinity of the vehicle. The vehicles are thus able to exchange and pass on the corresponding data among each other.

In addition, it is known from the general prior art that vehicles in a vehicle fleet exchange data cyclically with a backend server, which is realized as a cloud solution via the Internet, for example. There, too, a current traffic situation can be reconstructed directly or in a downstream system from the movement data of the vehicles that have transmitted their data records cyclically. This, in turn, serves to control the volume of traffic and can include information on and/or warnings of congestion.

When the data records are transmitted to the backend server, the vehicle typically identifies itself accordingly, for example with a TLS client certificate. The accuracy of the reconstruction of the traffic situation is dependent here on both the spatial and temporal resolution of the data records transmitted by the vehicle.

However, movement data of road users, such as vehicles in particular, must be regarded as personal data that should be pseudonymized or anonymized by the backend server, for example. Common anonymization approaches, however, such as the introduction of artificial spatial and/or temporal blurring or random noise, may have a negative influence on the use of the data records intended by the backend, especially with regard to the quality of a reconstruction of the traffic situation. This is just as big a disadvantage as the abandonment of anonymization in order to keep the quality of the reconstruction high.

Exemplary embodiments of the present invention provide a method for anonymizing movement data, in which method the anonymization is ensured and also a high quality of the evaluation of the data can be achieved.

The solution corresponding to the method according to the invention basically includes two approaches, which can be used both individually and in combination with each other in order to ensure anonymization of the movement data. In accordance with the invention, these movement data consist here at least of individual time- and position-related data records, which thus consist, for example, of a position provided with a timestamp. In order to ensure that the transmission to the backend server has been performed by an appropriately authorized vehicle within the vehicle fleet, these data are typically signed with the private key of the vehicle, the affiliation of which to this vehicle is proven by a certificate corresponding to the private key, for example a TLS client certificate, which is sent at the same time. This would now ensure, however, that the corresponding data record could be easily assigned to the corresponding vehicle in the backend server. In order to prevent precisely this, it is now possible to use the transmission of data between different vehicles, which is known in principle from the prior art mentioned at the outset, so that the movement data collected in the form of the data records and to be transmitted to the backend server are transmitted in such a way that, in accordance with the invention, the transmission of at least some data records is performed indirectly via at least one other vehicle. The other vehicle is thus used as a kind of "proxy" in order to conceal the actual origin of the data from the backend, since this information then does not arrive at the backend server, but only locally at the other vehicle, which then forwards the data on and thus conceals the actual origin of the data. This makes anonymization possible.

Another problem with anonymization is that if the backend server has a more or less complete set of data records of a vehicle, the backend server can reconstruct an entire ordered movement history of this vehicle from this set, even if the route sections are possibly unsorted or mixed with travelled route sections of another vehicle. The reason for this is that the individual route sections can be reconstructed accordingly from data records that follow one another without gaps in time/space if they match in their positions and timestamps and can therefore be clearly assigned to a vehicle.

In order to counteract this problem, it can now be provided, additionally or alternatively to the solution described above, that the position reference and/or time reference in at least some data records is made noisy before transmission. In this case, an inaccuracy is built in to prevent sorting of the data in the manner described above, which would then allow conclusions to be drawn about the affiliation of the entire movement profile to a specific vehicle. The amount of noise only needs to be minimal here in order to, for example, make corresponding timestamps so noisy that they no longer match exactly. The same applies to position data, which can, for example, be made so noisy that the vehicle's journey on a particular road can be recognized, but not the lane in the case that the road is a multi-lane road. This means that it is no longer possible to clearly determine how the data are affiliated with each other, so that anonymization is thus also possible in this case. Nevertheless, the quality of the data is maintained with a relatively high degree of accuracy in order to still ensure a qualitatively good evaluation of the data by the backend server in the desired manner. In many cases, for the reconstruction of the traffic situation, it is not decisive here to know which vehicle was at exactly which place in which exact time period, but rather it is sufficient to know that the vehicle was driving on this road at approximately the same and average speed, without it being important which lane exactly was used, etc.

It is particularly advantageous if anonymization is achieved through a combination of both solution aspects. It then becomes even more difficult to trace the data back to a specific vehicle on the basis of the data transmitted to the backend server. This ultimately increases the quality of the anonymization without adversely affecting the data quality with regard to the evaluation of the data.

According to an extraordinarily favorable development of the method according to the invention, it can now be provided that all vehicles within a vehicle fleet connected to the backend server have a common shared vehicle certificate and an affiliated private key, wherein signatures created with this private key are transmitted together with the data records directly or via at least one other vehicle to the backend server. This exchange of the movement data together with the signature created using the private key shared by all vehicles ensures, on the part of the backend server, that the received data have actually been recorded by a vehicle within the vehicle fleet and transmitted directly or indirectly to the backend server. This satisfies the security requirement on the part of the backend server, without the need for signatures and associated certificates used to verify them to directly assign each data record to a specific vehicle within the vehicle fleet.

According to an extraordinarily favorable embodiment of the method according to the invention, it can further be provided that the data records are made noisy to differing extents depending on the proximity to a starting point of the route and/or in the case of activated navigation, for example of a navigation system, to a planned end point of the route. The strength or magnitude of the noise, i.e., the degree of artificially inserted blurring of the position and/or time in the particular data record, can therefore be adjusted in particular as a function of starting points and potential end points of a route. Since, in terms of data protection, the starting points and the end points in particular are more in need of protection than points where the vehicle is currently travelling, a particularly high protection function applies to these. Therefore, it can be provided accordingly that in the region of the starting points and end points, for example in a corresponding radius of a few kilometers or a corresponding cycle time of a few cycles, the noise is stronger than in the other regions, so that the quality might decrease in these regions, but overall an improved data protection function can be achieved through the stronger noise in the region of these particularly "private" points.

According to an extraordinarily favorable development of this variant of the method according to the invention, it can even be provided that data records for positions such as the starting point and, in the case of active navigation of a navigation system, the end point are not transmitted to the backend server, and, in particular, that data records recorded in spatial proximity to the starting point and/or end point are also not transmitted. This improves the protection, further still, of the starting point and of the end point of a route, which could possibly provide particularly accurate conclusions about the specific vehicle and in particular the persons using the vehicle.

In the case of the combination of the two variants, i.e., in the case of making the data records noisy and transmitting at least some data records via at least one other vehicle, it can also be provided in accordance with an extraordinarily favorable development of the concept that the type and the strength of the noise is decided in a manner coordinated between the vehicles involved. Such a coordination of the type of noise is particularly useful in the case of an encounter between vehicles if this encounter is used for the exchange of data records, which the other vehicle in question then forwards to the backend server. Particularly at such points, improved anonymization can then be achieved by temporarily increasing the noise.

According to an extraordinarily favorable development of this, it can also be provided in a corresponding variant of the method according to the invention that the data records for positions where vehicles encounter one another and transmit the data records from one vehicle to the other are accordingly provided with a stronger noise than other data records. This means that the data records immediately before and after the exchange are made noisier, so that the position and time of the exchange can be better disguised.

In the case of transmission of some data records via at least one other vehicle, in which case the vehicles exchange the data records, it can be provided accordingly that the vehicles exchange the data records and delete the data records sent to the other vehicle and update their own route on the basis of the exchanged foreign data records. In this way, it can be achieved that a vehicle that is actually travelling from a starting point A to an end point D and in between encounters the other vehicle at a point C, appears to the backend server as if it were travelling from B, which is actually the starting point of the other vehicle, to C and then from C to the end point D. Its route from point B to point C and then on to point E, on the other hand, is falsified in such a way that, for the backend server, a journey from point A, the starting point of the first vehicle, via point C to point E is simulated. This also serves to improve the anonymization of the data and at the same time reduces the amount of data to be transmitted, since each vehicle no longer has to transmit several of its own and foreign data records, but only the foreign data records that have not yet been transmitted up to the time of the encounter with the other vehicle, and from there again its own data records, as applicable up to the encounter with a third vehicle, and so on.

According to this particularly favorable embodiment of the method according to the invention, it can then be provided that the exchange or transfer of data between vehicles takes place when they are in temporal and/or spatial proximity to each other. This can be ensured on the one hand by the transmission technology of the vehicle-to-vehicle communication, and on the other hand by the corresponding position data. For example, if the vehicles are driving adjacently to each other on a multi-lane road, a corresponding exchange can take place in order to make simple communication possible on the one hand and on the other hand in order to keep the data quality at the backend server correspondingly high despite the exchange of data and the anonymization thus achieved.

A very favorable embodiment of the method according to the invention can now also provide that the data records are transmitted on the basis of a predefined parameterizable time and/or number of data records. For example, a cycle time can be predefined so that the data are transmitted every 60 seconds, or a transmission can take place after every 10 to 20 collected data records, for example.

According to an extraordinarily favorable embodiment of the method according to the invention, it can also be provided that the anonymized movement data are marked as such. The backend server can then recognize via corresponding markings that it is carrying out its evaluations and reconstructions on the basis of anonymized data, which might or must lead to a changed interpretation of the data situation, because it may be decisive to know that individual sections, but not the entire route, have been driven by the same vehicle, for example if data specific to the particular vehicle type, the speed profiles, or the like are to be taken into account.

Further advantageous embodiments of the method according to the invention will also become clear from the exemplary embodiment, which is illustrated in greater detail below with reference to the FIGURE.

BRIEF DESCRIPTION OF THE SOLE DRAWING

The sole FIGURE shows a route diagram of two simple routes which each consist of three waypoints and which are travelled by two different vehicles.

DETAILED DESCRIPTION

Referring to the sole FIGURE as an example, one of the two vehicles 1, 2 shown in the FIGURE may transmit its movement data as a sequence of position data records consisting of a position and a timestamp. Such a sequence could, for example, take the form ((position 1, timestamp 1), (position 2, timestamp 2), (position 3, timestamp 3), etc.). These data records are transmitted accordingly to the backend server 3, which is shown purely by way of example as a cloud. The backend server 3 then obtains the information valuable to it, for example the temporal-spatial average speed of the vehicle 1, 2 from the individual route sections described by two subsequent position data records. It should be noted here that an isolated data record in the form described above is largely worthless for a traffic analysis, as it only states that a vehicle 1, 2 was at the stated position at the time of the timestamp. Most valuable for the backend server 3 are therefore sequences of data records with as few gaps as possible, which ideally, in contrast to an unsorted set of route sections, are already pre-sorted accordingly and can thus be processed quickly and with little effort by the backend server 3. In principle, the information content is the same here regardless of the sorting, since the same information can be reconstructed, but the computing effort is greater correspondingly for the case of unsorted data records.

Thus, the form of transmission preferred by the backend 3 is the (gapless) sequence of position data records that all belong to the same vehicle 1, 2. However, this is also the least anonymous form of the recorded vehicle movement data, because the entire movement history of the vehicle 1, 2 can be directly derived from this sequence.

In general, anonymity is violated in two ways when position records are transmitted.

1. On the one hand, the position data records are transmitted to the backend 3 by the vehicles 1, 2 themselves. To ensure that only data from trustworthy sources are transmitted to the backend 3, the vehicles 1, 2 must authenticate themselves at the backend 3, for example by means of individual certificates and TLS, prior to the transmission. In this way, the backend 3 always knows with which vehicle 1, 2 it is communicating and thus also from which vehicle it has received each position data record.
2. If the backend 3 has a (more or less) complete (possibly unsorted) set of route sections travelled by a vehicle 1, 2, the backend 3 can reconstruct the (more or less) entire ordered movement history of this vehicle from this set, even if these route sections are unsorted and possibly mixed with the route sections travelled by other vehicles. The reason for this is that the individual route sections of a gapless movement history of a vehicle 1, 2 are connected or "matched" to each other in such a way that the end position or end timestamp of the preceding route section is the same as the start position or start timestamp of the following route section. Since the position (for example GPS coordinate) and the timestamp (accurate at least to the second) identify a space-time point very precisely, the probability is very low, or better said, almost zero, that another route section belonging to another vehicle will have a "matching" start or end point, i.e., will be completely identical in position and timestamp. This means that the route sections "belonging together", i.e., those belonging to a vehicle 1, 2 or to a movement history, can always be identified even from a possibly very large "unsorted" pool of route sections originating from different vehicles 1, 2 and can be put in the correct order and thus compiled to form a (complete) movement history.

A remedy against the first weakness is the use of a "proxy" for the transmission of the position data records, since the vehicle 1, 2 does not transmit its position data records itself, but uses an "intermediate station" for their transmission, which the backend 3 also trusts, but which does not pass on to the backend 3 the identity of the vehicle 1, 2 from which it has received the data. In particular, another vehicle 1, 2 that is in the vicinity could take over this task and could send the "foreign" position data records together with its own position data records to the backend 3, without indicating their origin. Alternatively, route sections can also be exchanged between the vehicles 1, 2 by transmitting from each vehicle 1, 2 partly their own and partly foreign route sections or partial movement histories.

If route sections are only transmitted from vehicles 1, 2 to the backend 3, every route section that is to reach the backend 3 must ultimately be transmitted by either one of the vehicles 1, 2. The aim should be to have those route sections transmitted to the backend 3 by foreign vehicles 1, 2 whose "non-assignability" to the vehicle 1, 2 driving this route section makes the greatest contribution to anonymization. For example, it may be expedient not to transmit a certain number of the first or last sections of a route, i.e., the route sections driven immediately after the start or immediately before the destination, because on the one hand the information concerning the start or the destination of a route may be particularly sensitive and on the other hand these partial movement histories, since they are only coupled from one end to the overall movement history, can no longer be associated with this vehicle 1, 2 having travelled these partial movement histories. In this way, a particularly high technical and semantic anonymization effect can be achieved by transmitting a certain number of the first or last sections of a route by a foreign vehicle 1, 2.

In the example of the FIGURE, vehicle 1 starts at starting point A and travels the route A-C-D. Vehicle 2 starts at starting point B and travels the route B-C-E. The vehicles 1 and 2 thus encounter one another at the encounter point C, where they are very close to each other in terms of time and space, for example are driving next to each other on a multi-lane road. At this point in time of the great spatial and temporal proximity of the two vehicles 1, 2 to each other, they now exchange their data. The data records, not yet transmitted, between points A and C of vehicle 1 and between points B and C of vehicle 2 are exchanged accordingly, wherein each vehicle 1, 2 deletes the transmitted data accordingly after transmission to the other vehicle 2, 1 and then continues on its previously intended path. At the end of the route, the movement data relating to route B-C-D are now available from vehicle 1 in the region of the backend server 3 and those relating to route A-C-E from vehicle 2 accordingly. The movement data history therefore no longer corresponds to reality and has been anonymized accordingly to the backend server 3.

One measure against the second weakness described above would be to make the data contained in the route sections noisy by changing positions and/or timestamps slightly but sufficiently prior to the transmission in order to make reconstruction of the movement history and/or assignment of the individual route sections to a vehicle 1, 2 significantly more difficult or even impossible. The problem with this is that the more accurate the data, the better the results of the subsequent traffic analysis based on this vehicle movement data. This means that too much noise will have an unfavorable effect on the results of the subsequent traffic analysis. However, too weak, purely symbolic noise, which makes a purely syntactic matching of end points impossible, but hardly influences their semantics, i.e., their value, is not sufficient to prevent a reconstruction of a movement history and/or an assignment of a route section to a specific vehicle 1, 2, because in this case, instead of checking for strict equality, it is sufficient to use a simple temporal-spatial distance measure for position data records in order to identify corresponding insufficiently noisy route section end points despite their formal inequality and thus to be able to make the corresponding assignments of route section end points.

Thus, the objective should be to use the "noise" sparingly and only make noisy, prior to the transmission, those end points of the route sections for which noise would make a disproportionate contribution to anonymization and to transmit the other route section end points unchanged to the backend 3.

It is proposed, as already described above, in the case of sufficient spatio-temporal proximity of two vehicles 1, 2, i.e., two vehicles 1, 2 that are spatially adjacent at a certain point in time, to transmit the position data records of one vehicle 1 that have accrued up to that point but have not yet been transmitted to the backend 3 to the other vehicle 2 (the neighboring vehicle) and then to have them transmitted by this other vehicle 2 to the backend 3 at an immediately subsequent or later point in time, for example in the form of a (unsorted) set of route section data or in the form of a sequence of (sorted) position data records, of a partial movement history.

In particular, in the case of more than two spatio-temporally adjacent vehicles 1, 2, it is proposed that one vehicle collects the position data records from more than one other adjacent vehicle and then transmits them together to the backend 3.

In particular, it is proposed that, in the case of two or more spatio-temporally adjacent vehicles 1, 2, the adjacent vehicles 1, 2 exchange the data they have accumulated up to that point and then transmit this foreign data to the backend 3 at an immediately subsequent or later point in time, together with their own position data records, for example in the form of an (unsorted) set of route section data or in the form of a sequence of (sorted) position data.

Furthermore, when deciding which vehicle 1, 2 transmits the data of which other vehicle 1, 2 to the backend 3, it is proposed to take into account the level of the anonymization effect that can be achieved in each case by, for example, transmitting the route sections or partial movement histories driven immediately after the start and immediately before the destination, if possible by foreign vehicles 1, 2.

Furthermore, it is proposed that the spatio-temporally adjacent vehicles 1, 2, jointly and in a coordinated manner, make their position-timestamp data, which are very similar at this location and at this point in time, noisy in such a way that the backend 3 can no longer directly identify which future partial movement history matches which past partial movement history (transmitted at this spatio-temporal point from one vehicle 1, 2 to the other or exchanged at this spatio-temporal point between the vehicles).

Furthermore, it is proposed that all vehicles 1, 2 that are adjacent to each other in this location-time point participate in this noise of the position data records by all introducing position data records (synchronization data records) that are coordinated with each other and that define the end of the corresponding route section travelled before this synchronization point and the beginning of the route section to be travelled after this synchronization point. In this way, it is significantly more difficult for the backend 3 to identify the corresponding partial movement histories, i.e., those belonging to the same vehicle 1, 2, which lie before the synchronization point in terms of time and space, and the partial movement histories which lie after the synchronization point.

It is further proposed to use the same synchronization data record in all adjacent vehicles 1, 2, namely one of the synchronization points, i.e., one of the spatio-temporal points where all vehicles 1, 2 under consideration are adjacent to each other. In this case, the backend 3 can quickly identify that it is a synchronization point (because several vehicles 1, 2 cannot be located in the same space-time point), but a simple direct assignment from the partial movement histories located before the synchronization point to the partial movement histories located after the synchronization point is no longer possible.

Alternatively, it is proposed to be able to select slightly noisy (close together) but different synchronization data records in the adjacent vehicles 1, 2 in a synchronization point, wherein the end points of the last route section of the partial movement history potentially originating from another vehicle 1, 2 preceding the synchronization data record are adapted to this artificially generated synchronization data record in order to feign to the backend 3 a continuous consistent movement history originating from a vehicle 1, 2. In this way, it is made more difficult for the backend 3 to detect a potential synchronization point. It is additionally proposed that the vehicles 1, 2 belonging to the group of adjacent vehicles 1, 2 first exchange the partial movement histories already travelled immediately before the synchronization point with each other according to the principle of maximum anonymization described above or according to the random principle and then adapt the foreign partial movement history to their particular own synchronization data record. If a vehicle 1, 2 transmits partial movement histories, located before the synchronization point, of several vehicles 1, 2, one or more of them can be matched with the synchronization data record.

It is further proposed to decouple the decision of which vehicle 1, 2 transmits which position data records or partial movement history to the backend 3 and which partial movement histories are combined with each other for deception purposes in order to form plausible overall movement histories.

Furthermore, it is proposed to consider several vehicles 1, 2 as spatio-temporally adjacent at the synchronization point (position, timestamp) if, for example, for predefined positive distance values DistanceTime>0 and DistanceSpace>0 for any two vehicles 1, 2 from the considered set of vehicles 1, 2, a time t from the time interval [Timestamp−DistanceTime, Timestamp+DistanceTime] exists at which the spatial distance between the two vehicles is smaller than or equal to DistanceSpace.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

What is claimed is:

1. A method for anonymizing movement data of vehicles, the method comprising:
    collecting, by the vehicles, individual time- and position-related data records, wherein individual time- and position-related data records are movement data of the vehicles; and
    transmitting, by the vehicles to a backend server, the collected data records,
    wherein the vehicles are equipped with a position detection device and a communication device configured to transmit and receive data to/from the backend server and to/from other road users,
    wherein at least some of the collected data records are transmitted indirectly to the backend server via at least one other of the vehicles and a position or time reference in at least some of the collected data records is made noisy prior to the transmission to the backend server,
    wherein making the collected data records noisy and transmitting at least some data records indirectly via at least one other vehicle, a type and strength of noise is coordinated between the vehicles involved.

2. The method of claim 1, wherein data records for positions where vehicles encounter one another and transmit data records from one vehicle to the other vehicle are provided with a stronger noise than data records from other positions.

3. The method of claim 1, wherein the at least some of the collected data records are made noisy to differing extents depending on proximity to a starting point of a route or with activated navigation to a planned end point of the route.

4. The method of claim 3, wherein a starting point or end point and collected data records in spatial proximity to the starting point or end point are not transmitted to the backend server.

5. The method of claim 1, wherein the collected data records are transmitted between vehicles in temporal and spatial proximity to one another.

6. The method of claim 1, wherein the collected data records are transmitted to the backend server based on a predefined parameterizable time period or number of data records.

7. The method of claim 1, wherein the anonymized movement data are marked as anonymized.

* * * * *